United States

Altman

4,114,171

Sep. 12, 1978

[54] REFLEX CAMERA WITH INTERNAL ZOOM LENS

[75] Inventor: Richard M. Altman, Woodland Hills, Calif.

[73] Assignee: Vivitar Corporation, Santa Monica, Calif.

[21] Appl. No.: 674,229

[22] Filed: Apr. 6, 1976

[51] Int. Cl.² ............ G02B 15/00; G03B 19/12; G03B 17/04; G03B 3/00

[52] U.S. Cl. ............ 354/152; 350/187; 354/191; 354/195; 354/286

[58] Field of Search ............ 354/200, 201, 193, 195, 354/197, 275, 286, 202, 191, 228, 231, 152, 155, 199; 350/187

[56] References Cited

U.S. PATENT DOCUMENTS

| | | | |
|---|---|---|---|
| 2,126,128 | 8/1938 | Crumrine | 354/191 |
| 2,126,300 | 8/1938 | Wittel | 354/191 |
| 3,232,197 | 2/1966 | Kasahara | 354/155 |
| 3,594,068 | 7/1971 | Kirstein et al. | 350/187 X |
| 3,682,067 | 8/1972 | Tanaka et al. | 354/187 |
| 3,750,549 | 8/1973 | Waaske | 354/286 |
| 3,782,260 | 1/1974 | Ettischer et al. | 354/286 |
| 3,850,507 | 11/1974 | Uesugi | 350/187 |
| 3,876,290 | 4/1975 | Back | 350/187 |
| 3,879,743 | 4/1975 | Wick et al. | 354/275 X |
| 3,890,626 | 6/1975 | Ettischer | 354/197 |
| 3,955,206 | 5/1976 | Hashimoto | 354/152 |
| 3,956,759 | 5/1976 | Karikawa | 354/152 X |
| 3,968,504 | 7/1976 | Komine | 354/286 X |
| 3,970,366 | 7/1976 | Sekiguchi | 350/187 X |
| 3,972,056 | 7/1976 | Tsiyimoto et al. | 354/195 X |
| 3,975,750 | 8/1976 | Yoshino et al. | 354/187 X |
| 4,037,238 | 7/1977 | Leitz et al. | 354/152 |

FOREIGN PATENT DOCUMENTS 934,748  8/1963  United Kingdom ............ 354/152

OTHER PUBLICATIONS

8/1975, Modern Photography, Keppler on 110 SLR Zoom, pp. 52, 54, 152.

"Camera Magazine," C. J. Bucher Ltd., No. 8, Aug. 1975, p. 47.

*Primary Examiner*—Donald A. Griffin
*Attorney, Agent, or Firm*—DeLio and Montgomery

[57] ABSTRACT

A camera of the so-called pocket type having an objective lens including means for varying the equivalent focal length. The optical axis of the overall lens is folded to have two forward portions and a connecting lateral portion with the primary zooming elements on the lateral portion. The view finder system axis is a linear continuation of the lateral objective axis.

24 Claims, 9 Drawing Figures

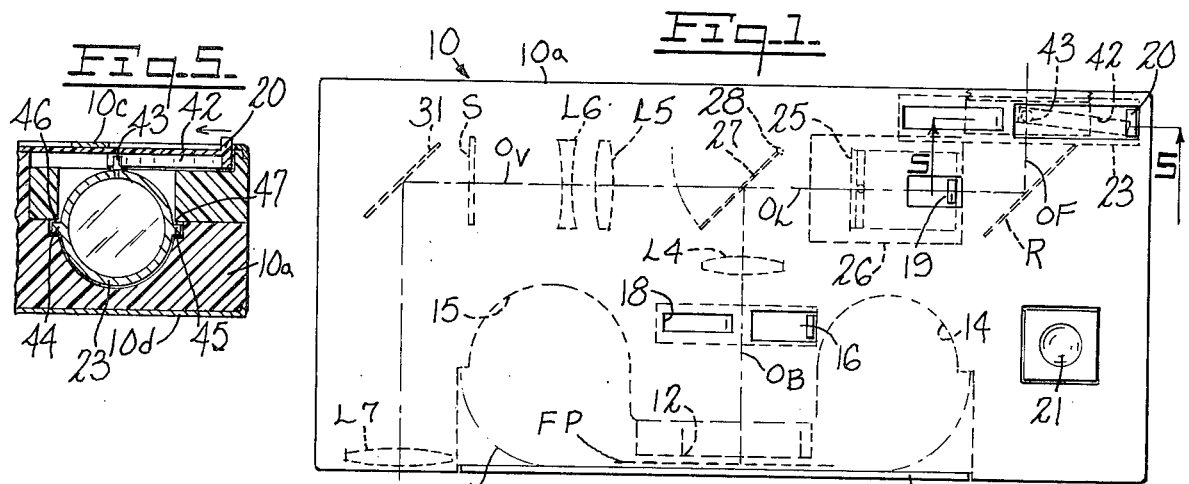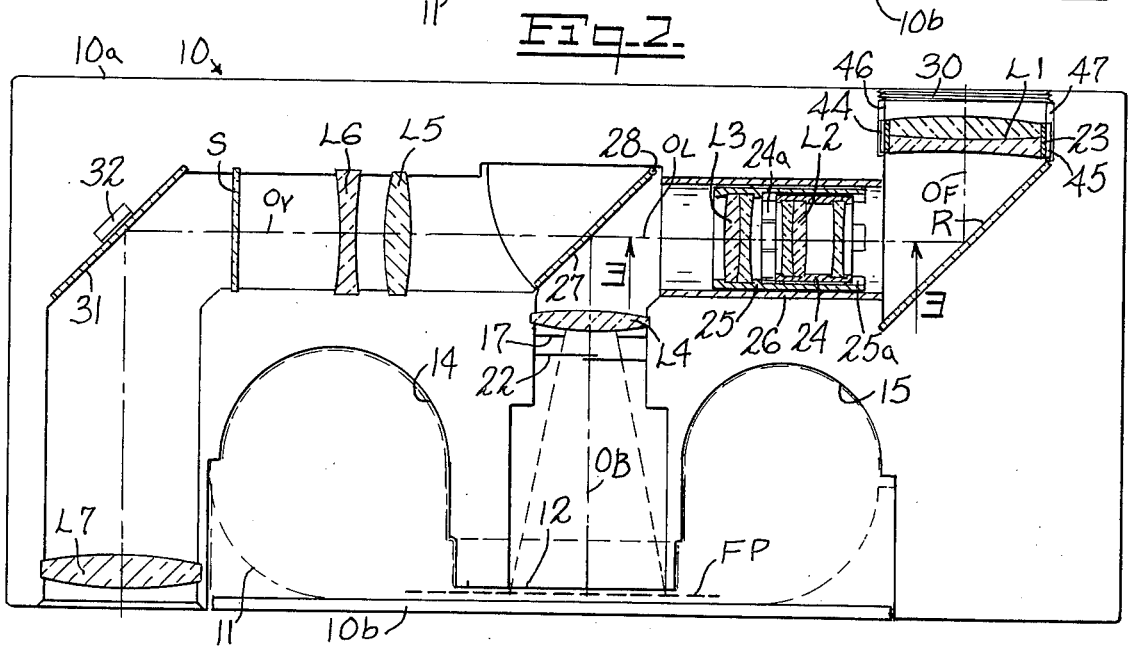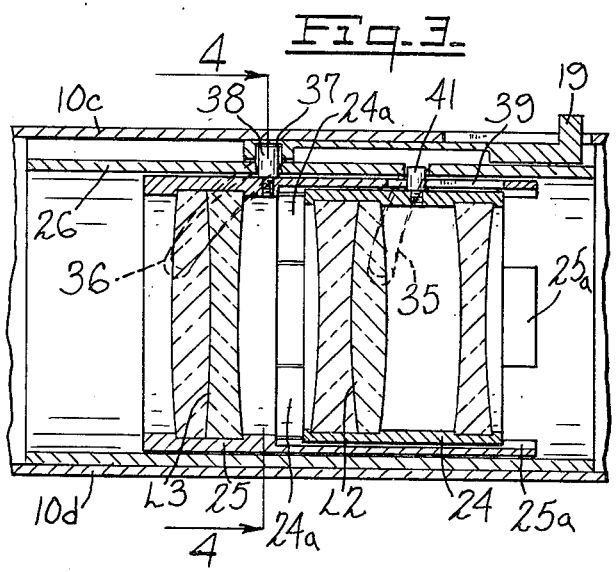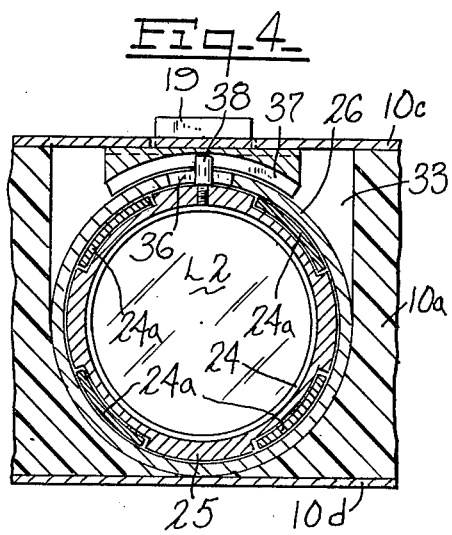

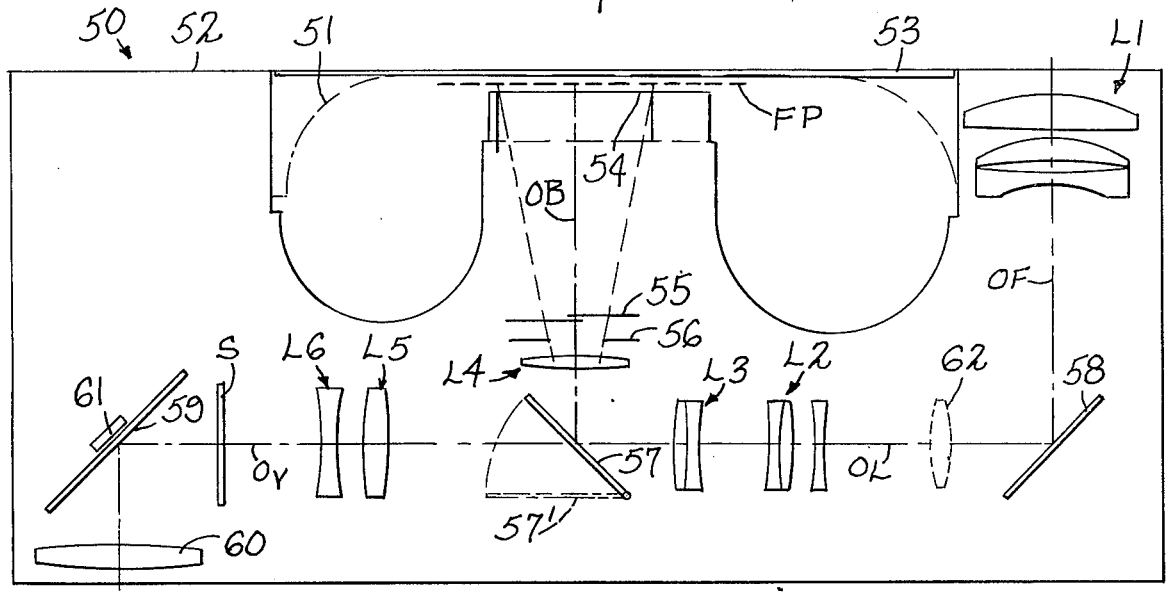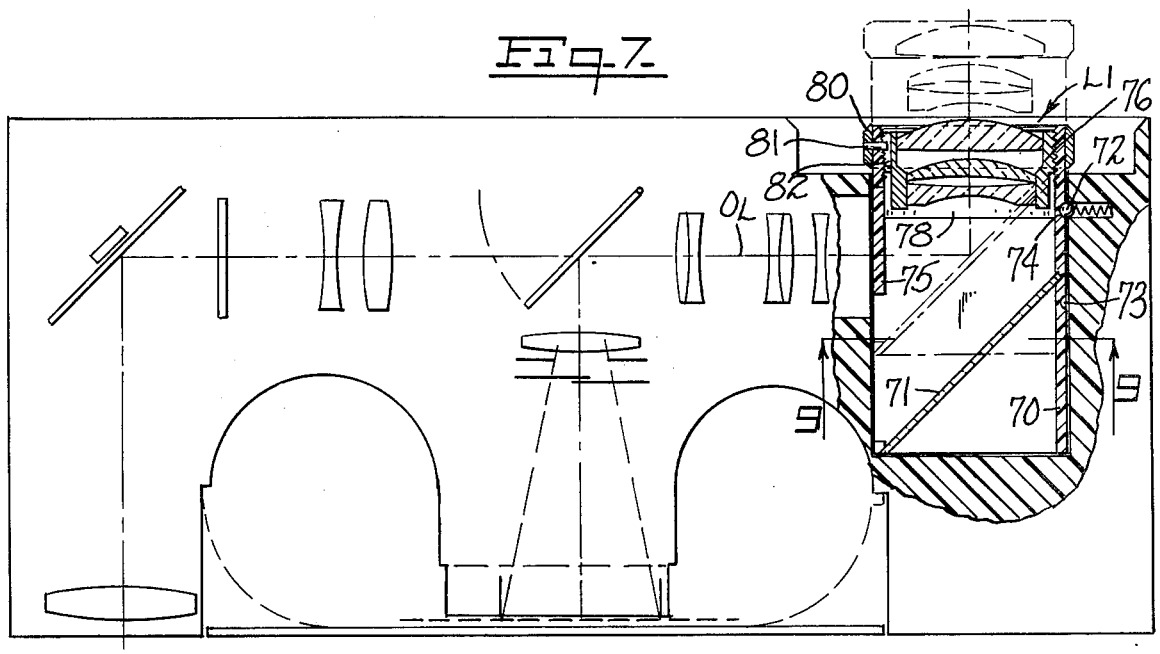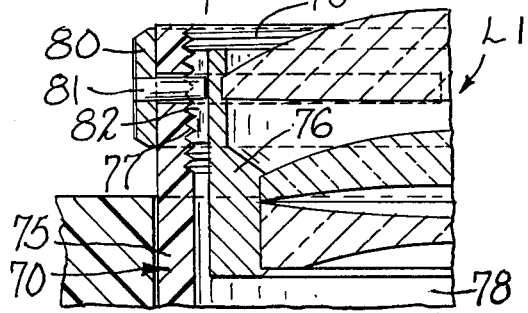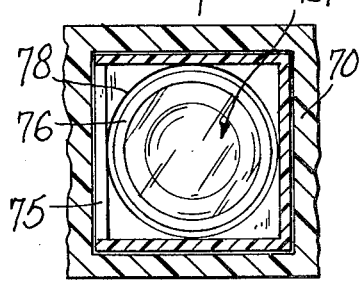

REFLEX CAMERA WITH INTERNAL ZOOM LENS

This invention relates to cameras and more particularly relates to a camera having a zoom or variable focal length objectives lens contained within the camera housing.

Cameras of small dimension which are easily pocketable have recently become popular. One such camera type is identified as using a 110 Series film format in which the image frame is 13 × 17mm. For the most part, such cameras have been constructed of fixed focus viewfinder type cameras. Such cameras, however, lack the ability to accept interchangeable lenses of different focal lengths. There have been some suggestions of making the lenses interchangeable (Popular Photography, October, 1975); however, a permanently protruding lens element is considered objectionable by some in that it means more parts to carry and limits the pocketability of the camera. Additionally, some pocket cameras have been proposed with through-the-lens viewing and focusing to avoid the use of the range finder and the inherent parallax problem. It has also been proposed that an internal zoom lens may be built in to the camera so as to overcome the problem of non-interchangeability of lenses.

The present invention provides a new and improved camera of a so-called pocket size having an internal optical system for varying the focal length of the overall objective lens, and further permits through-the-lens viewing as the conventional single lens reflex camera.

The invention provides a camera having a variable focal length objective lens disposed along a folded optical axis, and a viewing system which is a continuation of a portion of the objective optical axis. Controls for both focusing and varying the focal length are conveniently disposed on the camera housing.

Briefly stated, the invention in one form thereof comprises a generally rectangular camera housing adapted to accept film disposed in a cassette. The cassette has a window therein which defines the image frame. Disposed in front of the image frame is an aperture stop and the shutter together with a rear objective lens group on a forward axis portion and a mirror which folds the optical axis nominally 90° to a lateral axial portion. Disposed on the lateral objective axis portion are lens groups to accomplish zooming and image focusing compensation, and then a second mirror which folds the optical axis another nominally 90° to its original forward axial direction. On the second forward axis portion is a primary objective lens which is axially movable for focusing. Disposed on and as a continuation of the lateral axis is a group of lenses with a focusing screen followed by a mirror which reflects the image axis nominally 90° to an eyepiece. Disposed behind the third mirror which may be partially transparent may be a light sensitive device for metering purposes.

An object of this invention is to provide a new and improved camera of the type described having a variable focal length objective in the camera housing.

Another object of this invention is to provide a camera of the type described with a new and improved optical system for varying the focal length of the objective lens and providing through-the-lens viewing.

Another object of this invention is to provide a camera of the type described having an elongated folded optical path for the total objective lens system which permits the provision of both focusing by the primary objective lens and variation of the focal length with a variable power relay system, and further permits enough room for complex lens groups and elements for zooming with aberration correction.

A still further object of the invention is to provide a camera of the type described, maintaining compactness while providing single lens reflex viewing.

The features of the invention which are believed to be novel are particularly pointed out and distinctly claimed in the concluding portion of this specification. However, the invention both as to its operation and organization together with further objects and advantages thereof may best be appreciated by reference to the following detailed description taken in conjunction with the drawings, wherein:

FIG. 1 is a top plan view of a camera embodying the invention showing the controls therefor;

FIG. 2 is an enlarged view of the camera of FIG. 1 with the top removed to show the arrangement of optical elements thereof;

FIG. 3 is a view seen in the plane of lines 3—3 of FIG. 2;

FIG. 4 is a view seen in the plane of lines 4—4 of FIG. 3;

FIG. 5 is a view seen in the plane of lines 5—5 of FIG. 1;

FIG. 6 is a diagrammatic plan view of another camera embodying the invention showing another arrangement of the optical axis of the camera;

FIG. 7 is a diagrammatic plan view of another camera embodying the invention where the primary objective lens is retractable into and out of the camera body;

FIG. 8 is an enlarged view of a portion of FIG. 7;

FIG. 9 is a view seen in the plane of lines 9—9 of FIG. 7.

A camera 10 embodying the invention has a generally rectangular shaped housing 10a as viewed from the top and is adapted to accept a film cassette 11 which as shown in FIGS. 1 and 2 is back-loaded in the camera through a door 10b. Cassette 11 has a window therein at the location indicated by the reference numeral 12 and the film plane is indicated by the reference FP. The film is incrementally advanced from a first chamber 14 to a second chamber 15 past window 12. Disposed on the top of the camera is a slide 16 which adjusts the opening of an iris 17 (FIG. 2) which defines the aperture stop. A window 18 is provided with appropriate indicia to show the aperture.

A second slidable control member 19 is provided to vary the focal length of the objective and a third control member in the form of a slide 20 is provided to effect focusing of the objective lens. A shutter release button 21 is also provided on the upper side of the camera housing to release shutter 22.

As previously mentioned, the film is conventionally housed in a cassette of the type having a small gear exposed for engagement with a gear or pinion (not shown) on the lower floor of the camera housing and a slide bar disposed beneath the housing (not shown) may be utilized to advance the film one frame. This is conventional mechanism utilized in one form or another in all cameras of this type.

It will be noted that the zoom control slide 19 and the focusing control slide are disposed adjacent the forward right-hand corner of the camera so that they may easily be manipulated by the same one hand of the operator. Indicia for the focusing distance and the focal length may be placed on the housing adjacent the slides.

The overall objective lens is defined on a twice-folded optical axis having a lateral portion $O_L$ and two forward portions $O_B$ and $O_F$ offset by $O_L$. The lens comprises a first focusing objective L1 in an axially movable mount 23 on axis $O_F$. Axis $O_F$ is folded to $O_L$ by a reflecting means shown as a mirror R. Positioned on the lateral portion of the optical axis $O_L$ is a variable focal length lens which as shown comprises a three-element variator L2 and a two-element compensator L3 in lens mounts 24 and 25, respectively. Mounts 24 and 25 are positioned within a barrel member 26. The variable focal length lens may be comprised of three moving groups as a matter of optical design. Lens group L2 is a variator lens which is positionable within barrel 26 to change the equivalent focal length of the lens while lens L3 moves in a predetermined relation with respect to lens L2 in order to maintain the image plane fixed. The optical axis $O_L$ is folded 90° to the axis $O_B$ when a pivotal mirror 27 is in the position shown in FIG. 2. Mirror 27 is pivoted about point 28, and moves to the position shown in FIGS. 1 and 2 as the shutter is operated by release button 21, as in the case of the conventional single lens reflex camera.

Mirror 27 could be pivoted at its other end, or alternatively could be fixed in position and made partially reflective and partially transparent.

On axis $O_B$ is a second objective lens L4 in front of iris 17 and shutter 22. Thus it may be seen that there is provided a normal four-group zoom lens comprising a front focusing objective, a variator, a compensator and a rear objective. It is to be understood that in some cases, it may be desired to provide three zooming groups dependent on the space available and the need for aberration correction, or alternatively, to provide a fixed lens between the zooming groups and the front objective.

The described arrangement does provide a compact zoom lens through the provision of the twice-folded axis. Moreover, the position of the iris between the film plane and the objective lens provides more effective exit pupil control regardless of the type of an auxiliary lens which may be attached to the camera. An auxiliary lens mount 30, shown as threaded may be provided in body 10a. The position of the iris in the optical system effectively places the image of the iris and shutter in the immediate vicinity of the first objective lens.

The entrance pupil of the overall lens is thus in or in the immediate vicinity of the first objective lens. Therefore L1 could be replaced with another lens to change the zoom range, or even with another zoom lens. Either a zoom range changing objective or an additional zoom lens may be mounted to mount 30. Alternatively, only an objective lens and relay lens could be positioned on the lateral axis and a zoom lens mounted to mount 30. In this camera, as shown, the zoom groups L2 and L3 perform the function of a relay lens.

When mirror 27 is pivoted 45° counterclockwise as seen in FIGS. 1 and 2, the viewfinder axis $O_V$ is coincident with lateral axis $O_L$. Disposed on the axis $O_V$ is an air spaced doublet comprising lenses L5 and L6 whose function is to focus the image on a fixed focusing screen S which is disposed optically equidistant to mirror 27 as the film plane FP. The axis $O_V$ and the image on screen S is folded or reflected 90° by the mirror 31 to an eyepiece lens L7, for viewing by the eye. Mirror 31 is preferably partially transparent to enable a percentage of the light incident thereon to be read by a photosensitive device 32 position therebehind. The doublet comprising lens L5 and L6 also serves the function of a field lens as found in the viewfinding system of the conventional single lens reflex camera.

As shown in FIGS. 3 and 4 the camera 10 has upper and lower walls 10c and 10d. Defined therebetween is a recess 33 in which is seated barrel member 26 (FIG. 4).

The zooming mechanism is illustrated as of the type shown in U.S. Pat. No. 3,784,285 in which relative non-linear axial movement of the zooming lens groups is achieved by linear movement of slide 19. Barrel 26 has camming slots 35 and 36 therein which define the relative movement of mounts 24 and 25. Slide 19 has an arcuate slot 37 defined therein which receives a follower 38 in lens mount 25. Follower 38 extends through slot 36 in barrel 26. The mounts 24 and 25 have interdigitated feet 24a and 25a, respectively, which move on the inside peripheral wall of barrel 26. One of the feet 25a contains a slot 39. Extending from mount 24 through slot 39 into cam slot 35 is a follower pin 41.

In operation, as slide 19 moves to the left as shown in FIG. 3, mount 25 will move in accordance with the contour of slot 36 with both axial and rotary components of motion. The rotary motion will cause the walls of slot 36 to move pin 41 in accordance with the contour of cam slot 35. Thus, both lens mounts 24 and 25 follow predetermined axial motion which may be relatively non-linear to effect change of focal length of the overall objective lens.

The mechanism shown is exemplary to the extent that two moving groups are used to vary the focal length. If three moving groups should be utilized, then a mechanism as shown in U.S. Pat. No. 3,915,557 may be utilized to achieve the relative non-linear motion of three zooming groups with a linearly movable actuating member. In the mechanism shown in FIGS. 3 and 4 either of the mounts 24 or 25 may be the primarily driven mount and the other the follower. The arcuate slot 37 permits rotary motion of pin 38 as it also moves axially in slot 36.

Focusing is accomplished by movement of the slide 20 which has a transverse slot 42 therein engaging a pin 43 on lens mount 23. Lens mount 23 may have axially projecting ears 44 and 45 in slots 46 and 47, respectively, defined in the housing to prevent rotary motion thereof. Thus as slide 20 moves to the left as viewed in FIGS. 1 and 5, axial motion will be transmitted to lens mount 23.

A further embodiment of the invention is shown in FIG. 6 in which the optical axis of the overall objective lens has a path of increased dimension within the camera. This permits the use of a more sophisticated front objective and other lens elements which will both increase the zoom ratio and further increase the facility for aberration correction. As shown in FIG. 6 a camera 50 is arranged for front loading of a film cassette 51 in the camera body 52 through a loading door 53. The focal plane FP is defined at the front of the camera behind the cassette window 54. Disposed in front of the window is a shutter 55, an aperture control iris 56 and a rear objective lens L4. The forward optical axis $O_B$ on which the objective lens L4 resides is folded 90° by a pivotal mirror 57 in a photographic operation. The lateral optical axis $O_L$ includes zooming lens groups L2 and L3. Lateral axis $O_L$ is again folded by a fixed mirror 58 to forward axis $O_F$ which includes the front objective L1. The axis $O_V$ is a linear continuation of the lateral axix $O_L$ and includes lenses L5 and L6 for the purposes previously described to focus an image on focusing screen S. The focused image S is reflected 90° by a mirror 59 to an eyepiece 60. A photosensitive device 61 may be positioned behind mirror 58.

This arrangement provides an increased dimension of the optical axis within the camera and thereby permits room for all correcting lenses within housing 52. If desired, a stationary of slightly movable field lens 62 may be provided on the axis $O_L$, and any desired additional lens elements may be positioned on the forward axis $O_F$.

In operation, the mirror 57 for viewfinding purposes is in the dotted line position 57'.

The focusing mechanism and the zooming mechanism for the camera 50 of FIG. 6 may be the same as that exemplified for the camera of FIGS. 1 to 5.

FIG. 7 exemplifies another camera of the type shown in FIGS. 1 to 5 but with provision for an elongated front objective of the type shown in FIG. 6.

In FIG. 7 like elements to those of FIGS. 1 and 2 bear the same identifying numerals and only the difference in optical construction will be described. Front objective L1 is mounted in a slidable housing member 70 in the camera body. Housing member 70 is slidable from the position shown in full line to the position shown in broken line so that the mirror 71 contained therein is aligned tiwh the lateral axis $O_L$.

A spring-loaded ball detent 72 will releasably latch housing 70 in either a retracted position determined by a detent slot 73 or a forward operative position determined by a detent 74. Housing 70 has a side opening defined at one end by the termination of side wall 75 so that when the housing 70 is placed in an operative position the lateral axis $O_L$ will essentially coincide with the correct point of mirror 71.

Front objective L1 is in a mounting member 76 which has an external threaded portion 77. Housing 70 is formed annularly at end portion 78, and has internal threads 79 carrying threads 77 of mount 76. A focusing ring 80 is disposed about end portion 78 and carries a pin 81 extending through arcuate slot 82 in end portion 78 into an axial slot in mount 76. When ring 80 is rotated, it produces rotation of threads 77 on threads 79 and resultant axial focusing motion of mount 76 and lens L1. Pin 81 in slot 82 also limits the axial motion of mount 76.

The arrangement just described thus provides for an elongation of the front vertex distance of the lens within the housing, and the provision of any necessary lens elements for correction purposes.

Various changes may be made in the disclosed embodiments of the invention by one skilled in the art. For example, the stationary reflecting means may be triangular prisms rather than mirrors. The rear objective lens L4 may be made of two or more elements, and various optical designs may be utilized dependent on the range of equivalent focal lengths, and relative aperture of the lens.

It may thus be seen that the objects of the invention set forth as well as those made apparent from the foregoing description are efficiently attained. While preferred embodiments of the invention have been set forth for purposes of disclosure, modification to the disclosed embodiments of the invention as well as other embodiments thereof may occur to those skilled in the art. Accordingly, the appended claims are intended to cover all embodiments which do not depart from the spirit and scope of the invention.

What is claimed is:

1. A camera comprising a housing, a photographic lens in said housing on an optical axis which has first and second forward axis portions essentially perpendicular to the frame of film inserted in the camera but laterally displaced from each other, said second axis portion directed to intersect the frame of film inserted in the camera and a lateral axis portion between said first and second axis portions, said lens from the object end to image end comprising a first objective lens group on said first forward axis portion, first reflecting means changing said first forward axis portion to said lateral axis portion, a movable lens grouping on said lateral axis portion for varying the equivalent focal length of the lens, second reflecting means changing said lateral axis portion to said second forward axis portion, a stationary second objective lens group on said second axis portion in front of the film frame position, means for moving said movable lens grouping to vary the equivalent focal length of the lens, means for moving said first objective to focus said lens, a viewfinder optical system in said housing, said viewfinder optical system including an optical axis which is a continuation of said lateral axis portion extending past said second reflecting means and a focusing screen and an eyepiece in said viewfinder optical system.

2. The camera of claim 1 further including a shutter on the image side of said second objective group.

3. The camera of claim 2 further including an aperture control located between said shutter and said second objective group.

4. The camera of claim 1 where said viewfinder system includes a lens group on said continuation axis and the focusing screen is therebehind, and third reflecting means for folding the viewfinder optical axis, and an eyepiece.

5. The camera of claim 4 wherein said second reflecting means is a mirror pivotal between a photographing position and a viewing position.

6. The camera of claim 1 wherein said camera housing has an object side and a viewing side, said housing having an opening on the object side arranged to receive a supply of film, said second reflecting means disposed to fold said lateral axis portion into said second forward portion toward the object side of said housing and the film supply.

7. The camera of claim 1 wherein said camera housing has an object side and a viewing side, said housing having an opening on the viewing side to receive a supply of film, said second reflecting means disposed to fold said lateral axis portion into said second forward portion toward the viewing side of said housing and the film supply.

8. The camera of claim 1 wherein said means for moving said movable lens grouping to vary the equivalent focal length of the lens is mounted in said housing for only linear sliding motion.

9. The camera of claim 1 wherein said camera housing is generally rectangular in plan view and has an upper surface and a lower surface, said means for focusing and said means for moving said movable lens grouping to vary the equivalent focal length both comprise linearly movable sliding members, said sliding members positioned to move in the direction of the major dimension of said housing and both located on said upper surface to be operative by the same one hand of an operator.

10. The camera of claim 1 wherein said first objective lens group and said first reflecting means are mounted in a movable member in said housing, said movable member being positionable between a retracted position in said housing and an operative position where said first objective lens extends outwardly of said housing and said first reflecting means is aligned with said lateral axis portion.

11. The camera of claim 1 further including lens housing means movable out of and into said camera housing along said first forward axis portion, said lens housing mounting said first objective.

12. The camera of claim 11 wherein said first reflecting means is disposed in said lens housing.

13. The camera of claim 11 further including detent means for latching said lens housing means in either one of a retracted and an operative position.

14. The camera of claim 1 wherein said means for moving said movable grouping to vary the equivalent focal length comprises a linearly movable slide on said housing coupled to said movable lens grouping on said lateral axis portion.

15. A camera comprising a housing adapted to receive a film cartridge which defines a film plane in the housing, a photographic lens in said housing on an optical axis which has first and second forward axis portions essentially perpendicular to the film plane but laterally displaced from each other, said second forward axis portion intersecting the film plane and a lateral axis portion between said first and second forward axis portions, said lens from the object end to image end comprising a first objective lens group on said first forward axis portion, first reflecting means changing said first forward axis portion to said lateral axis portion, a movable lens grouping on said lateral axis portion for varying the equivalent focal length of the lens, second reflecting means changing said lateral axis portion to said second forward axis portion, a stationary second objective lens group on said second forward axis portion in front of the film plane, said first objective lens mounted in a second housing member within said camera housing, said second housing member being positionable between a retracted position in said camera housing and an operative position external of said camera housing along said first axis portion to increase the length of the front vertex distance of said lens, a viewfinder optical system in said housing, said viewfinder optical system including an optical axis which is a continuation of said lateral axis portion extending past said second reflecting means and a focusing screen and an eyepiece in said viewfinder optical system.

16. The camera of claim 15 wherein said second housing includes said first reflecting means, and said first forward axis portion is aligned with said lateral axis portion by said first reflecting means when said second housing is positioned in said operative position external of said housing.

17. The camera of claim 15 further including detent means for latching said second housing member in either one of a retracted and an operative position.

18. The camera of claim 15 further including means linearly movable on said housing for moving said movable grouping on said lateral axis portion.

19. A camera comprising a housing, a photographic lens in said housing on an optical axis which has first and second forward axis portions essentially perpendicular to the frame of film inserted in the camera but laterally displaced from each other, said second axis portion directed to intersect the frame of film inserted in the camera and a lateral axis portion between said first and second axis portions, said lens from the object end to image end comprising a first objective lens group on said first forward axis portion, first reflecting means changing said first forward axis portion to said lateral axis portion, a movable lens grouping on said lateral axis portion for varying the equivalent focal length of the lens, second reflecting means changing said lateral axis portion to said second forward axis portion, a stationary second objective lens group on said second axis portion in front of the film frame position, means for moving said movable lens grouping to vary the equivalent focal length of the lens, means for moving said first objective to focus said lens, and an aperture control located on the image side of said second objective group on said second forward axis.

20. The camera of claim 19 further including a viewfinder optical system, said viewfinder optical system including an axis which is a continuation of said lateral axis portion, and a focusing screen and an eyepiece in said viewfinder optical system.

21. The camera of claim 19 wherein said means for moving said movable lens grouping comprises a linearly movable sliding member on said housing.

22. The camera of claim 19 wherein a shutter is disposed between said second stationary objective group and said aperture control.

23. The camera of claim 19 wherein said camera has an object side and a viewing side, said camera having an opening on the object side to receive a film cartridge.

24. The camera of claim 19 wherein said camera housing has an object side and a viewing side, said housing having an opening on the object side arranged to receive a supply of film, said second reflecting means disposed to fold said lateral axis portion into said second forward portion toward the object side of said housing and the film supply.

* * * * *